United States Patent
Circosta et al.

(10) Patent No.: US 8,083,443 B1
(45) Date of Patent: Dec. 27, 2011

(54) POCKET HOLE PLUG CUTTER

(75) Inventors: Michael Circosta, Brooklyn, NY (US);
James B. McCandless, Guilford, CT (US); Burton Weinstein, New York, NY (US)

(73) Assignee: General Tools & Instruments Company LLC, New York, NY (US)

( * ) Notice: Subject to any disclaimer, the term of this patent is extended or adjusted under 35 U.S.C. 154(b) by 363 days.

(21) Appl. No.: 12/383,795

(22) Filed: Mar. 27, 2009

(51) Int. Cl.
*B23B 47/28* (2006.01)
*B23B 51/05* (2006.01)

(52) U.S. Cl. ............... 408/103; 408/203.5; 408/205; 408/241 S

(58) Field of Classification Search ........... 408/72 R, 408/103, 115 R, 203.5, 204, 205, 241 S; *B23B 47/28*
See application file for complete search history.

(56) References Cited

U.S. PATENT DOCUMENTS

| | | | | |
|---|---|---|---|---|
| 1,424,392 A * | 8/1922 | Baker et al. | ............... | 408/203.5 |
| 1,808,472 A * | 6/1931 | Mielke | ............... | 408/67 |
| 2,606,615 A * | 8/1952 | Pevey et al. | ............... | 408/205 |
| 2,748,817 A * | 6/1956 | Stearns | ............... | 408/204 |
| 4,595,321 A * | 6/1986 | Van Dalen | ............... | 408/205 |
| 5,681,134 A * | 10/1997 | Ebert | ............... | 408/205 |
| 5,800,099 A * | 9/1998 | Cooper | ............... | 408/1 R |
| 5,807,036 A * | 9/1998 | Lostlen | ............... | 408/97 |
| 5,810,524 A | 9/1998 | Wirth, Jr. | | |
| 6,254,320 B1 | 7/2001 | Weinstein | | |
| 6,273,652 B1 * | 8/2001 | Wirth et al. | ............... | 408/203.5 |
| 6,394,712 B1 * | 5/2002 | Weinstein et al. | ............... | 408/103 |
| 6,481,937 B1 | 11/2002 | Sommerfield | | |
| 6,585,459 B2 | 7/2003 | Wirth, Jr. | | |
| 6,637,988 B1 * | 10/2003 | Park | ............... | 408/103 |
| 6,726,411 B2 | 4/2004 | Sommerfield | | |
| 7,101,123 B1 | 9/2006 | Weinstein | | |
| 7,484,914 B1 | 2/2009 | Weinstein | | |
| 2006/0191122 A1 * | 8/2006 | Collins | ............... | 29/525.11 |
| 2008/0014035 A1 * | 1/2008 | Perkovich et al. | ............... | 408/1 R |

* cited by examiner

*Primary Examiner* — Eric A Gates
(74) *Attorney, Agent, or Firm* — Gordon D. Coplein

(57) ABSTRACT

A jig for cutting plugs for pocket holes from a workpiece has a base leg, from which transversely extend guide and clamp legs. One or more guide channels extend through the guide leg at an angle to an interior face of the guide leg to guide the sleeve of a rotating cutter bit that has a cutting edge at its end and a removed section forming a cutting blade. A clamp extends from the clamp leg to engage one face of a workpiece whose end is mounted on a raised ledge on the base leg and holds the workpiece opposing face against the guide leg interior surface as the sleeve end cutting edge and blade advances into and cuts entirely through the workpiece to cut the plug. A collar on the cutting bit shaft engages the guide leg to prevent the sleeve end cutting edge from contacting the base leg. The jig also can be used for making pocket holes by using the appropriate drill bit.

13 Claims, 2 Drawing Sheets

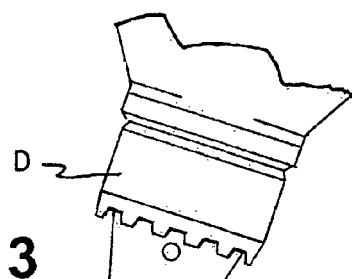
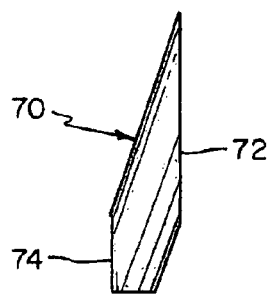
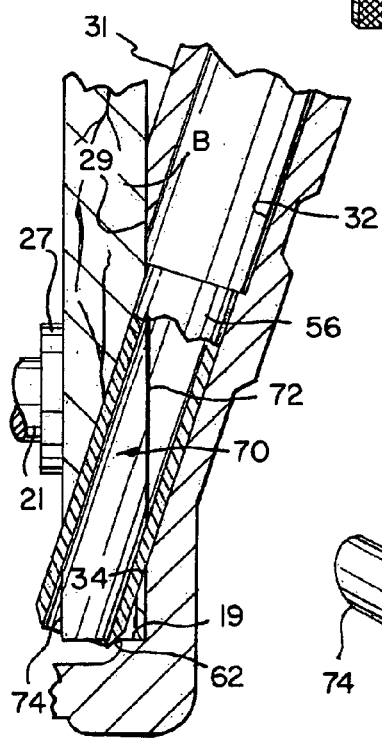
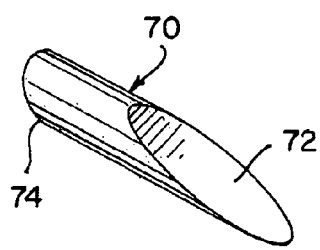
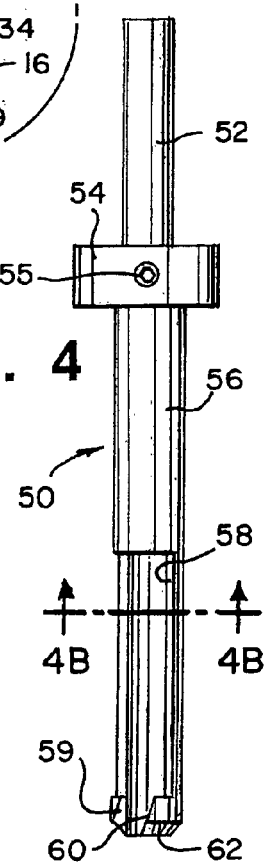

POCKET HOLE PLUG CUTTER

FIELD OF THE INVENTION

The invention relates to an apparatus for cutting plugs for pocket holes that has a jig for holding a board from which the plugs are cut and a cutter bit to cut the plugs and in which the jig also can be used for cutting pocket holes.

BACKGROUND OF THE INVENTION

Pocket holes are well known in the woodworking field to join two pieces of wood together. A pocket hole is one that is made at an acute angle, typically about 15°, to a surface of a first board to form an elongated somewhat elliptical shaped hole. A screw is passed through the hole and is screwed into a second board to form a secure joint between the two boards. Most often two such pocket holes are used spaced fairly closely together to form a secure joint between the two wood pieces.

To make the pocket hole a jig is used that holds the board in which the pocket hole is made. One such jig is shown in U.S. Pat. No. 6,254,320, which is owned by the assignee of this application. The jig of that patent is of one piece construction in the form of a U-shaped frame that has opposed guide and clamp legs that extend transversely upwardly from opposite sides of a base leg. One or more guide channels are formed in an outwardly flared part of the guide leg at an angle to it. The board in which the pocket hole is to be drilled is held against the guide leg inner face by a clamp extending from the clamp leg and a drill bit is guided within an angled guide of the guide leg to make the pocket hole in the board. Variations of the jig of that patent to accommodate boards of different thickness are disclosed in U.S. Pat. No. 7,101,123 granted Sep. 5, 2006, and U.S. Pat. No. 7,484,914 granted Feb. 3, 2009, both of which also are owned by the assignee of this application.

In the woodworking art wood plugs are used to fill circular screw holes made in boards that are joined together by one or more screws passing through one board into another board. It is conventional to use only a simple circular plug cutter that is mounted to a drill to make the plugs used to fit into the circular screw holes. The worker most often cuts the plugs from the same wood stock as the board in which the plug is to be used to fill the screw hole, or even a scrap piece of the board, so that a match can be obtained between the color and grain of the board and the plug to provide a finish for the board in which the plug does not look different.

Typical articles that are made using pocket hole joinery include frames and boxes. In many cases the pocket holes are hidden from view. Therefore it is not necessary to try to hide the pocket holes using wood plugs. However, in some cases it is desirable or necessary to use a plug to fill and hide a pocket hole. Plugs for pocket holes are available but these are typically purchased on a stand alone basis and not made from the same stock as the board having the pocket hole that is to be covered. Therefore, the worker is not always able to have a pocket hole plug that will be of the type of wood of the board having the pocket hole or its color and grain.

Accordingly, a need exists for an apparatus that will enable a worker to easily cut wood plugs for pocket holes. This will enable the worker to make an article that has a better finish with the pocket holes being filled by plugs that more closely match the boards that form the article.

BRIEF DESCRIPTION OF THE INVENTION

The pocket hole plug cutter of the invention has a jig that holds the workpiece board from which the plug is to be cut and a cutter bit. The board from which the plugs are to be cut preferably is of wood type, color and/or grain that will match the board having the pocket hole that the plug is to fill. The jig is of unitary one piece construction and is generally U-shaped having a base leg from whose opposing sides transversely extend a guide leg and a clamp leg. The guide has an inner face against which one face of the board from which plugs are to be cut is to be held by one end of a screw clamp mounted in the jig clamp leg that engages the opposing board face. A ledge is provided at the interior junction of the base and guide legs on which the end edge of the board rests to elevate it above the inner face of the base leg.

The guide leg has an upper part that flares outwardly and one or more cutter bit guide channels are formed in the guide leg upper part at an angle to the guide leg inner face against which the one face of the board is held. The guide channel angle is the same as that from which pocket holes are cut into a board using another apparatus such as that described in one of the aforesaid patents. The jig also can be configured such that one or more guide channels are provided for making the pocket holes in addition to the channel or channels for guiding the cutter bit to cut the plug's.

The cutter bit of the invention has a shaft for mounting in the chuck of a drill and a collar on the shaft that is to engage the guide leg at the entrance to the guide channel. A sleeve extends from the shaft and a part of the lower end of the sleeve is cut away to form an cutting blade generally aligned with the sleeve axis. The blade edge is already sharp or is sharpened to serve as a cutter blade. The end edge of the sleeve also is sharp or is sharpened. This is only one example of a cutting bit design and it should be understood that there are other bit designs that can be used in combination with the jig of the invention.

The worker advances the rotating cutter bit in a guide channel toward the face of the clamped board. During the advancement the cutter bit is guided in the channel by engagement of the sleeve outer surface with the channel inner wall. The sleeve sharp end edge moves out of the channel to engage and cut into the face of the clamped board. The bit sleeve sharp end advances into and through the and acts with the sleeve blade edge to cut a plug from the board. Since the cutter bit is moving at an angle relative to the board face that is the same at which a pocket hole is made, the resulting plug that is cut will have a face that matches that of the pocket hole. The cut plug matching face will fit into the pocket hole being filled and any excess of the plug will be trimmed to make a flush finished surface. The combination of the collar on the bit shaft that engages the channel entrance on the guide leg and the ledge that supports the boars end raised above the base leg inner face prevents the bit end from contacting the base leg inner face as the cutter bit cuts through the board.

In a preferred embodiment of the invention the guide leg has a plurality of guide channels. The channels can be of different internal diameters to accept different diameter cutter bits to cut different size plugs. Alternatively, one or more of the jig guide channels can be used to cut pocket holes by using a suitable drill bit so that the jig can be used both for making pocket holes in a workpiece as well as for cutting the pocket hole plugs. As an alternative a bushing is used in a guide channel sized to accept a plug cutter bit with the bushing having an internal diameter to accept and guide a pocket hole cutter drill bit.

BRIEF DESCRIPTION OF THE DRAWINGS

Other objects and advantages of the present invention will become more apparent upon reference to the following specification and annexed drawings in which:

FIG. 3 is a side elevational view of the jig and the cutter bit shown partly in cross-section;

FIG. 3A is an enlarged view of a part of FIG. 3;

FIG. 4 is an elevational plan view of the cutter bit;

FIG. 5 is a plan view of a pocket hole plug that has been cut; and

FIG. 6 is a front perspective view of the pocket hole plug of FIG. 5.

DETAILED DESCRIPTION OF THE INVENTION

Figure 1:
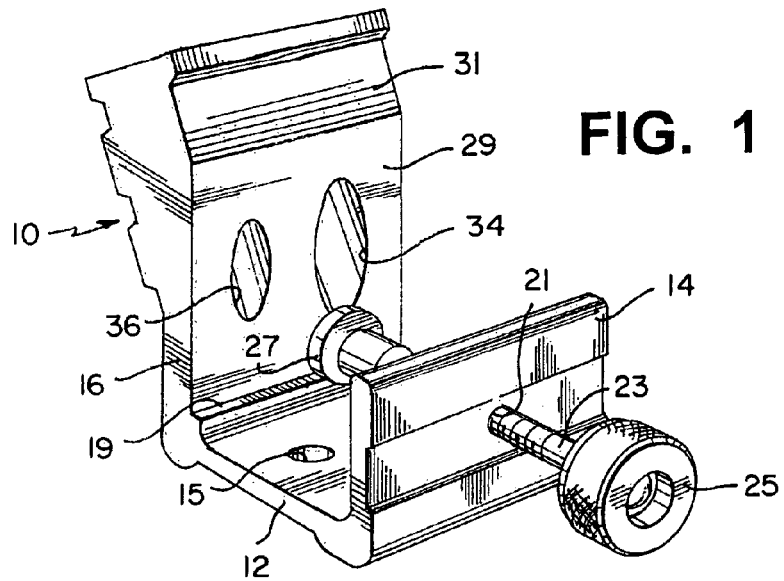
FIG. 1 is a rear perspective view of the jig used for cutting the pocket hole plugs.

In describing the invention terms such as "horizontal" and "vertical" are relative and relate to the drawing figures as shown. The components of the invention can be used in any desired orientation.

Figure 2:
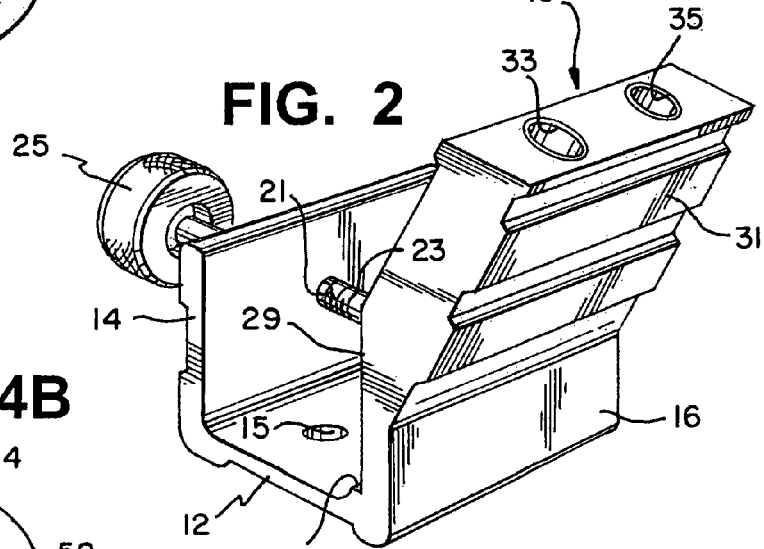
FIG. 2 is a front side perspective view of the jig.

Referring to FIGS. 1 and 2, there is a jig 10 that is generally U-shaped. The jig has a base leg 12 from whose opposite sides transversely extend two opposing parallel legs 14 and 16, hereafter referred to as the clamp leg and the guide leg. The jig 10 is a unitary structure and can be made of any suitable material, such as aluminum. The jig is made by any conventional construction technique, such as casting in one piece or making separate pieces for the legs and joining them together. The outer surface of the base leg 12 has flat portions to permit the jig to rest on a flat surface such as a workbench. Several holes 15 preferably are formed through the base leg 12 to permit passage of screws (not shown) to secure the jig to a surface (not shown) such as the top of a workbench. The outer surface of each of the base, clamp and guide legs is shown with spaced depressed sections across the width of each leg. These are primarily for decorative and fixture manufacturing purposes.

The clamp leg 14 is transverse to the base leg 12 and has a threaded hole 21 to accept a threaded screw clamp 23. A knob 25 is on the end of the screw exterior to the jig and a workpiece engaging cap 27 is on the screw end interior of the fixture. The position of the cap 27 relative to the jig guide leg 16 is controlled by rotating the screw knob 25. While the cap 27 is shown as having a circular outer face only of somewhat greater diameter than the screw 23, it can be enlarged to provide a larger surface for engaging a workpiece.

At the interior of the junction of the base leg 12 and the guide leg 16 there is a horizontal ledge, or rib, 19 that extends across the guide leg and the base leg 12. The ledge 19 is generally rectangular and its upper face is parallel to inner face of the base leg. As described below, the edge of the board from which plugs are to be cut is supported on the ledge. The supporting arrangements shown in the aforesaid patents and application also can be used to keep the board end edge raised away from the base leg. The inner face 29 of the guide leg above the ledge 19 is flat and is vertical and transverse to the inner face of the base leg 12 and the upper face of the ledge 19.

The guide leg 16 has an upper part 31 whose exterior flares outwardly at an angle to the vertical inner face 29. A pair of spaced circular guide channels 32, one of which is shown in FIGS. 3 and 3A, are formed in the guide leg upper part 31 at an angle to its flat vertical inner face 29. The angle of the guide channels to the guide leg inner face 29 is preferably the same as that used to make pocket holes in a workpiece. The channels 32 have respective circular entrances 33 and 35 for a cutter bit on the upper end of the guide leg enlarged part 31 and corresponding somewhat elliptical shaped exits 34 and 36 on the guide leg vertical inner face 29. The channel 32 of FIGS. 3 and 3A is the one that has the entrance 33 and exit 34. The other channel would have the same construction but be of a different diameter and the description of the other channel would be the same.

The number of channels can be selected as desired and there can be only a single channel or there can be three or more. Two guide channels are illustratively shown and as seen from their entrances 33 and 35 and exits 34 and 36 they are of different internal diameters. This is to accommodate different diameter cutter bits so that different size plugs can be cut to insert into pocket holes made by different size drill bits. In an alternate form of the invention one of the guide channels can be used to accommodate a bit to cut a pocket hole in a board in manner as described in the aforesaid patents. This would be accomplished by using the proper diameter drill bit to fit in one of the guide channels 32 with the drill bit having a stop collar to engage the guide leg upper wall so that it does not cut through the workpiece. In a still further alternative, a bushing is provided for a guide channel having a diameter sized to accept and guide a plug cutter bit. The bushing fits in the guide channel and provides a guide for a bit to cut a pocket hole in a work piece, such pocket hole forming bit being of lesser outer diameter than the plug cutter bit.

Figure 4A:
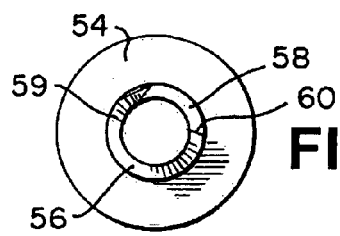
FIG. 4A is a bottom view of the cutter bit.
Figure 4B:
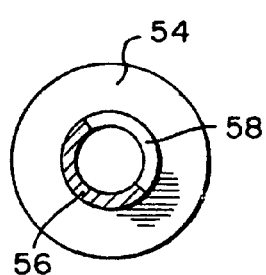
FIG. 4B is a cross-sectional view of the cutter bit along lines 4B-4B of FIG. 4.

FIGS. 4 and 4A-4B show a preferred form of the cutter bit 50 used with the jig 10. It has a shaft 52 that is to be inserted in the chuck of a drill, as shown in FIG. 3. A collar 54 is fixed to the shaft 52 such as by a set screw 55. The upper end of an elongated cylindrical guide sleeve 56 is fixed to collar 54. The lower part of the sleeve is cut away to form an elongated slot 58 that is axially aligned with the sleeve axis. A lower section 59 of the sleeve is cut away to angle from the lower end of slot 58 and enlarges in size toward the bottom end of the sleeve to form a blade edge 60. The blade edge 60 can be axially aligned with the sleeve axis or angled from it, with the latter being preferred. The sleeve blade edge 60 already is sharp due to the section 59 being cut at an angle to the sleeve longitudinal axis or it is sharpened by an externally applied tool (not shown). The sleeve lower end edge 62 also is sharp upon being made or it can be sharpened.

FIGS. 3 and 3A show the operation of the plug cutter. The lower end of a board B from which a plug is to be cut is placed on the jig base leg ledge 19 so that the board lower end is above the base leg inner face. The screw clamp knob 25 is rotated so that the cap 27 engages one flat face of the board and presses the opposite board face against the guide leg inner flat face 29. This aligns the board B vertically relative to the guide channels 32. The user inserts the shaft 52 of the cutter bit 50 into the chuck of a drill D which can be either a portable hand drill or a drill press set at the proper angle. The end 62 of the cutter bit sleeve 56 is inserted into a selected one of the entrance openings 33 or 35 of one of the guide leg angled channels 32 and the drill is energized. The guide channel selected will be of the correct diameter corresponding to the outer diameter of the bit sleeve 56.

The user advances the rotating drill bit sleeve in the guide channel and the sleeve lower cutting edge 62 into the board B. The sleeve 56 rotates as it is advanced into the board B and the sleeve lower end edge 62 and blade edge 60 cut entirely through the board to cut the plug from the board. During the movement of the cutter bit into the board the sleeve is guided by the engagement of its outer surface with the inner wall of the guide channel. The cutter bit is advanced in the guide channel until the cutter bit collar 54 engages the top surface of the guide leg angled top part 31. The collar 54 is set on the bit shaft 52 so that the lower end of the bit can cut through entirely through the board. The collar 54 and the ledge 19 that raises the board end edge off of the base leg prevent the lower end 62 of the cutter bit from hitting the jig base leg 12 inner face.

Wood chips formed during the plug cutting both accumulate in and pass out through the sleeve slot 58. The cut plug 70 is located in the sleeve slot 58 and is removed from it after the cutter bit has been withdrawn from the guide channel. Any wood chips that have accumulated in the cutter bit and the guide channel also are removed.

FIGS. 5 and 6 show the plug 70 cut from the board B by the rotating cutter bit lower cutting end 62 and the blade 60 as the bit is advanced into the guide channel 32. The plug has a front face 72 that fits into the pocket hole. The plug front face 72 is the face of the board that is held against the guide leg inner face 29. The plug is usually held in the pocket hole by glue applied to the pocket hole. The plug rear end 74, which is the bottom end edge of the board, will not be flush with the board surface having the pocket hole. This will be trimmed off such as by a wood chisel and/or sanding. When the board B from which the plug 70 is cut is of the same type as the board having the pocket hole then the surface of the latter will have a good match where the pocket hole exists.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

We claim:

1. A jig for making both a pocket hole in and for cutting plugs for the pocket hole from at least one workpiece comprising:
    a U-shaped jig having a base leg, a guide leg and a clamp leg with said guide leg and said clamp leg being transverse to and on opposing sides of said base leg, said guide leg having an interior face;
    a clamp extending from said clamp leg to engage one face of a workpiece and hold the workpiece second opposing face against said guide leg interior face; and
    a first and a second guide channel having different internal diameters formed in said guide leg at an angle to said guide leg interior face, one of said first and second guide channels for guiding a drill bit to make a pocket hole in a workpiece and the other guide channel for guiding a cutter bit to cut a plug from a workpiece to fit into the pocket hole made by the drill bit guided in said one guide channel, both said first and second guide channels having an entrance on an exterior surface of said guide leg and an exit at said guide leg interior face which opposes the workpiece second face.

2. The jig according to claim 1 wherein said jig further comprises a surface above said base leg on which an end edge of the workpiece is to rest.

3. The jig according to claim 2 wherein said surface above said base leg comprises a ledge at the interior junction of said base leg and said guide leg.

4. The jig according to claim 1 wherein said clamp comprises:
    an adjustable screw clamp threaded for rotation in said clamp leg having a cap at one end that is movable by rotation of said screw clamp to engage the workpiece first face to hold the workpiece second face against an interior surface of said guide leg during the time the cutter bit is advanced in said guide channel to cut into the workpiece second face.

5. The jig according to claim 1 wherein said guide leg has at least two guide channels.

6. The combination comprising a jig according to claim 1 and further comprising a cutter bit having a shaft, an elongated sleeve extending from said shaft having an outer surface that engages and is guided by the inner wall of said other guide channel and a cutting edge on its end, and a collar on said shaft that is to engage the guide leg at the entrance of said other guide channel set to prevent said sleeve cutting edge from contacting the inner face of said base leg as said sleeve cuts through the workpiece.

7. The combination according to claim 6 wherein said cutter bit sleeve has an area removed from near one of its ends to form a cutting blade that is generally axially aligned with the axis of said sleeve.

8. The combination according to claim 7 wherein said sleeve has an elongated slot having an end that communicates with said removed area.

9. The combination according to claim 8 wherein the edge of said sleeve cutting end is sharpened to cut into said workpiece as said sleeve is advanced in said guide channel.

10. The combination according to claim 6 wherein the edge of said sleeve cutting end is sharpened to cut into the workpiece as said sleeve is advanced in said other guide channel.

11. The combination according to claim 6 and further comprising a bit for drilling pocket holes to join two work pieces fitting into and guided by said one guide channel.

12. The combination as claimed in claim 6 wherein said blade edge is one of generally axially aligned with or at an angle to the longitudinal axis of said sleeve.

13. The combination as claimed in claim 6 wherein the edge of said sleeve end is sharpened.

* * * * *